Sept. 8, 1936.　　　　P. H. BRACE　　　　2,053,417
ARC WELDING APPARATUS
Filed Nov. 11, 1933　　　2 Sheets-Sheet 1
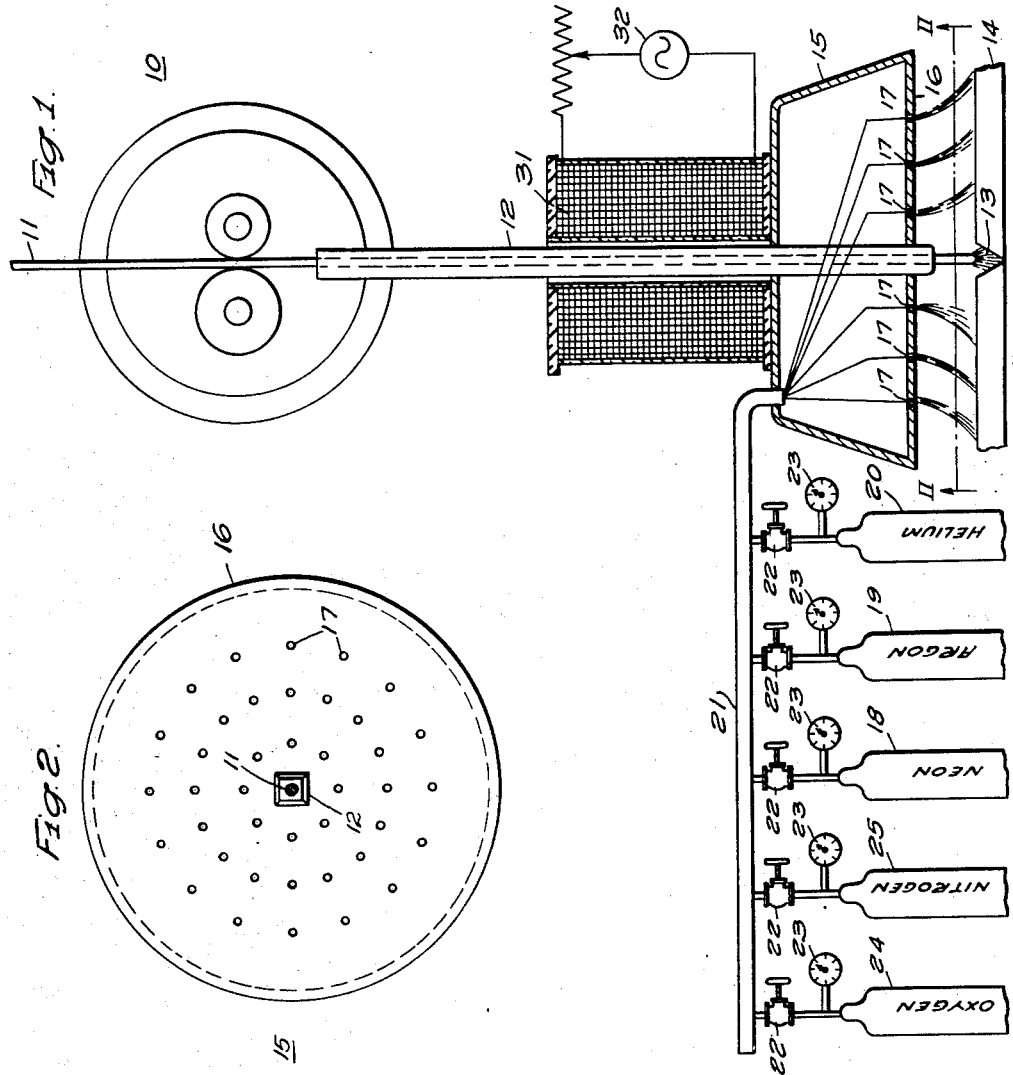
WITNESSES:
INVENTOR
Porter H. Brace.
ATTORNEY Sept. 8, 1936.  P. H. BRACE  2,053,417
ARC WELDING APPARATUS
Filed Nov. 11, 1933  2 Sheets-Sheet 2
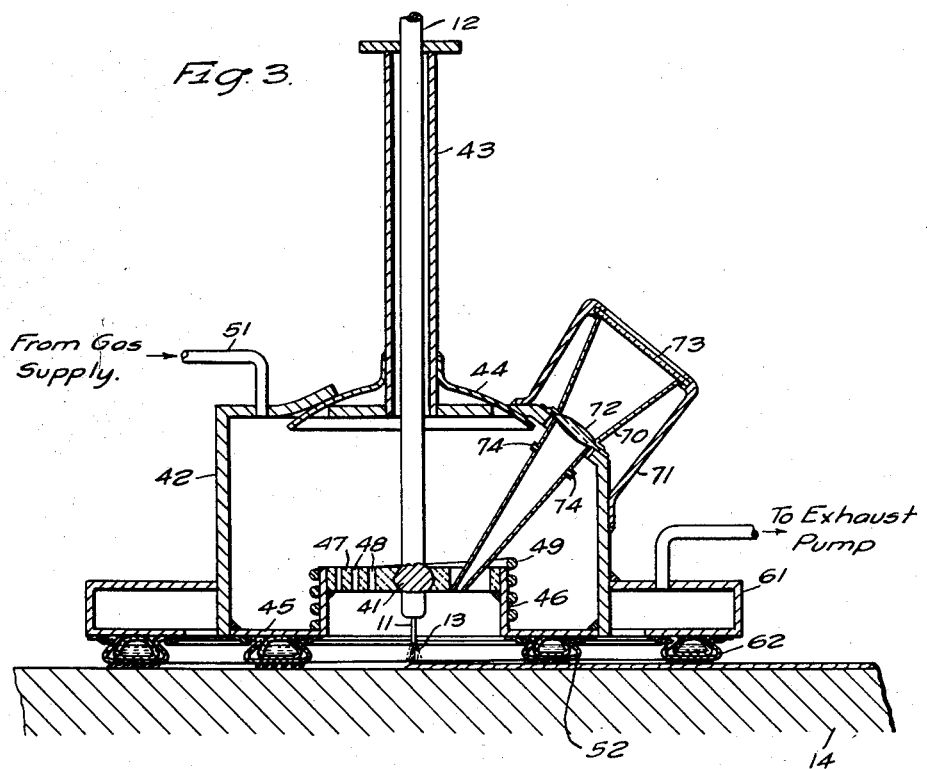
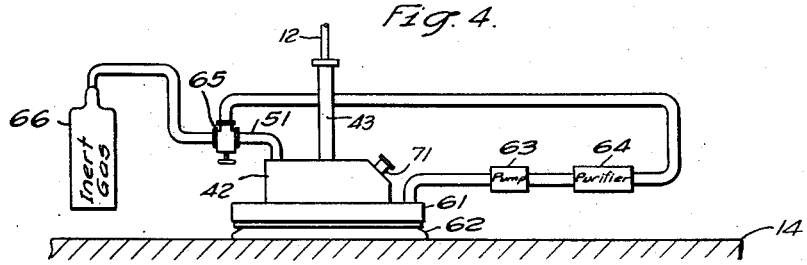
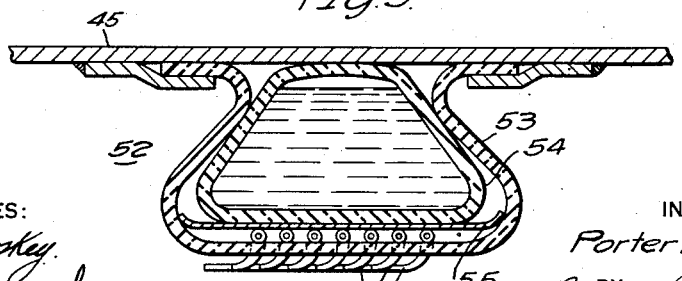
WITNESSES:
INVENTOR
Porter H. Brace.
BY
ATTORNEY Patented Sept. 8, 1936

2,053,417

UNITED STATES PATENT OFFICE 2,053,417

ARC WELDING APPARATUS

Porter H. Brace, Forest Hills, Pa., assignor to Westinghouse Electric & Manufacturing Company, East Pittsburgh, Pa., a corporation of Pennsylvania Application November 11, 1933, Serial No. 697,630

2 Claims. (Cl. 219—10)

My invention relates, generally, to electric welding and it has particular relation to electric arc welding.

In performing arc welding operations, it is desirable to avoid the inclusion of oxides and nitrides in the weld metal, since their inclusion causes hardness and brittleness and further renders the welding procedure more difficult. The oxides and nitrides are formed from the oxygen and nitrogen in the air which combines with the metal being welded while it is being fused by the electric arc.

In order to avoid the formation of the injurious oxides and nitrides in the weld metal, it has been proposed to carry out the welding operation in an atmosphere containing only an inert gas, such as helium, argon, neon and the like. By applying any of these inert gases, either singly or in combination, around the welding arc, it may be completely blanketed so that no air will be present while the welding operation is being performed. Due to the fact that these gases are inert and, therefore, not capable of combining with the metal being welded during the welding operation, they serve as a satisfactory means for excluding the oxygen and nitrogen in the air.

When the hot metal globules formed during the welding operation are protected by the inert atmosphere, as set forth, the exposed surfaces are free from oxides and other contamination. As a result, the high surface tension which is inherent to clean liquid metals immediately asserts itself and causes the metal to be formed in globules of relatively large diameter, thereby causing an irregularity in the transfer of the metal to the arc. Due to the relatively large globules that are formed, I have found that it is impossible to obtain a smooth deposition of metal, especially when alloys of the nickel-chromium type are welded. The metal is deposited in irregularly spaced spots and between them the work being welded is often burned.

As a result of considerable experimentation, I have found that a more regular and uniform transfer of the metal may be had under the foregoing conditions if the surface tension, which is inherent to the surfaces free from oxides and the like, is disrupted so that the metal will be transferred more regularly and smoothly from the welding electrode rather than by being transferred in the form of relatively large globules.

As is well known, the inert gases, such as helium, argon and neon, which are satisfactory for blanketing the arc to exclude air and other gases, are not plentiful. As a result, these gases are relatively expensive and a welding process which involves their use will entail considerable expense unless some means is provided for recovering the inert gas or gases after they have once been used.

In view of the foregoing, it is an object of my invention to provide arc welding apparatus which shall be simple and efficient in operation and which may be readily and economically manufactured and installed.

The principal object of my invention is to provide for the more regular deposition of metal by the arc welding process.

Another very important object of my invention is to provide for relieving the surface tension of metal globules formed at the arcing end of a metallic welding electrode in an atmosphere of inert gas.

Another important object of my invention is to provide for so adjusting the quantity of inert gas which is used for blanketing an electric welding arc with respect to the deposition of the metal being welded so that the partial pressures of the oxygen and nitrogen in the welding atmosphere will not be substantially greater than the disassociation pressures of the oxides and nitrides of the metal at the welding or fusion temperature.

Another object of my invention is to provide for causing a shielding gas to uniformly radially flow about a welding arc.

Still another object of my invention is to provide for recovering the inert gas or gases which are used to blanket a welding arc.

A further object of my invention is to provide for viewing the operation of a welding arc while it is being maintained in an atmosphere composed mainly of inert gas.

Other objects of my invention will in part be obvious and in part appear hereinafter.

My invention accordingly is disclosed in the embodiment hereof shown in the accompanying drawings, and comprises the features of construction, combination of elements, and arrangement of parts which will be exemplified in the construction hereinafter set forth and the scope of the application of which will be indicated in the appended claims.

For a more complete understanding of the nature and scope of my invention, reference may be had to the following detailed description taken in connection with the accompanying drawings, in which:

Figure 1 is a view, partly in side elevation and partly in section, of one embodiment of my invention;

Fig. 2 is a view in bottom plan of the gas nozzle shown in Fig. 1;

Fig. 3 is a sectional view illustrating a modification of my invention;

Fig. 4 diagrammatically represents a gas recovery system which may be used in practicing my invention; and Fig. 5 is an enlarged sectional view of one of the flexible sealing rings shown in Fig. 3.

Referring now particularly to Fig. 1 of the drawings, the reference character 10 designates generally an automatic welding head which may be used for feeding a welding electrode 11 through an electrode nozzle 12 to maintain an arc 13 between it and work 14 on which a welding operation is to be performed. It will be understood that the electrodes 11 and the work 14 may be connected to any suitable source of current for maintaining the arc 13. The automatic welding head 10 is preferably of the electro-dynamic type in order to insure a more regular feed of the electrode 11. Since this type of feeding mechanism is now well known to those skilled in the art, it has been deemed unnecessary to set forth a detailed description of it in this specification.

As has been set forth hereinbefore, it is desirable to maintain the arc 13 in an atmosphere of which the air containing oxygen and nitrogen is not present. In order to maintain this condition, a gas nozzle 15 is provided which may comprise a container in the form of a frustum of a cone having the top and bottom ends closed. The gas nozzle 15 may be secured to the electrode feed nozzle 12 by any suitable means.

It will be observed that the bottom plate 16 of the gas nozzle 15 is provided with a plurality of openings, as at 17, through which an inert gas or gases may flow from the several gas bottles or containers 18, 19 and 20 containing, respectively, neon, argon and helium. The several gas bottles may be connected by means of a common pipe 21 to the gas nozzle 15 as illustrated. A valve 22 individual to each of the gas bottles is provided for regulating the flow of the gas. Gauges 23 are also provided for indicating the pressures existing in the gas bottles.

It is desirable to avoid any disturbance of the arc 13 which might be caused due to eddy currents set up by the gas as it flows through the several openings 17 of the gas nozzle 15. In order to avoid this difficulty and to provide for a uniform outward radial flow of the gas so that its velocity at any point in the vicinity of the arc 13 will be the same, the openings 17 may be arranged as illustrated in Fig. 2. The several openings 17 are so positioned that the velocity of the gas in a radial direction will be the same. Therefore, there will be no tendency for eddy currents to be set up by non-uniform flow of the gas with the attendant disturbance of the arc 13.

In certain instances, it may be desirable to combine one or more of the inert gases with either oxygen or nitrogen or both. For this reason, additional gas bottles 24 and 25 are provided, as illustrated. In order to reduce the quantity of the inert gas or gases which it is necessary to use, I have found that they may be combined with certain proportions of nitrogen or oxygen or both. The relative quantities of the gases which should be used depends to a considerable extent upon the composition of metal on which the welding operation is being performed. In general, it may be stated, however, that the proportions of the gases, such as helium, argon or neon, should be so adjusted that the partial pressures of the oxygen and nitrogen in the welding atmosphere are not substantially greater than the disassociation pressures of the oxides and nitrides of the metal being welded at the welding or fusion temperature. When the rare gases are combined with the relatively inexpensive gases, such as oxygen and nitrogen or both, a considerable saving is effected while at the same time the undesirable oxides and nitrides are not formed in the deposited weld metal.

When the arc 13 is maintained in the shielding atmosphere, relatively large globules of the metal of which the electrode is composed are formed due to the relatively high surface tension which is present, as has been set forth hereinbefore. The high surface tension is present due to the fact that the exposed surfaces of the globules are free from oxides and other contamination which is usually present when the welding operation is carried on in an atmosphere of air.

I have found that it is desirable to disrupt the surface tension so that the molten metal will not be formed in the large globules, and as a result, there will be a smooth transition of the metal through the arc until it is deposited on the work being welded.

One method of disrupting the surface tension comprises the use of some mechanical vibrating device which will cause the electrode 11 to be oscillated in such manner as to shake off the molten metal as it is fused by the welding arc. Such a device is shown in Patent No. 1,689,882, issued to A. M. MacFarland on October 30, 1928, and assigned to the assignee of this application.

However, I prefer to use a more simple expedient for disrupting the surface tension and for this purpose I have provided a winding 31 which may be positioned coaxially with the welding electrode 11 and above the gas nozzle 15. The winding 31 is preferably energized from a source 32 of alternating current having a frequency of 25 or 60 cycles. The magnetic field generated by the winding 31, when energized from the alternating-current source 32, is applied to the arc 13. I have found that the magnetic flux produced by the winding 31 when energized from an alternating-current source sufficiently disrupts the surface tension which would otherwise be present to cause the formation of relatively large globules of the molten metal from the welding electrode 11.

In order to increase the effectiveness of the winding 31, it is desirable to construct the electrode nozzle 12 of steel for the same reason it is desirable to construct the gas nozzle 15 of a non-magnetic material, such as copper or brass. When the steel electrode nozzle 12 and the non-magnetic gas nozzle 15 are used, there will be a concentration of the alternating-current magnetic flux in the vicinity of the welding arc 13 with the result that the desired beneficial effects will be obtained more readily.

It will be apparent that a considerable quantity of the inert gas or gases will be required in order to continually blanket the arc 13 for arc welding operations extending over a long period of time. Therefore, it is desirable to provide for recovering the inert gas or gases after they have been used to blanket the arc 13 so that they may again be used. A system for recovering the inert gas is shown in Fig. 4 and in more detail in Figs. 3 and 5.

Referring now more particularly to Fig. 3, it will be observed that the electrode nozzle 12 is pivotally mounted by means of a ball-and-socket joint 41 in what may be termed an inner annular chamber 42. The electrode nozzle 12 extends up through a nozzle stem 43 which is arranged to be moved relative to the inner chamber 42 so that the welding electrode 11 may be directed to maintain the arc 13 at a predetermined point on the work 14. A packing member 44 is provided, as illustrated, around the bottom of the nozzle stem 43 in order to provide a substantially gastight connection with the inner chamber 42 while still permitting relative rotative movement.

As illustrated, the inner chamber 42 is provided with an annular ring 45 at the bottom, on the inner periphery of which a cylindrical member 46 is mounted. At the top of the cylindrical member 46 a perforated plate 47 is secured having openings 48 which are spaced in a manner similar to that described for the openings 17 in the gas nozzle 15, shown in Fig. 1.

In order to provide the desired magnetic field for disrupting the surface tension, as described hereinbefore, a winding 49 is provided around the cylindrical member 46. The winding 49 may be connected to any suitable source of alternating current (not shown), as will be readily understood. In order to reduce the effect of eddy currents to a minimum, it is desirable to construct the perforated plate 47 of some refractory or high resistivity material.

In the event that it is desired to provide a cooling medium, the winding 49 may be in the form of a hollow conductor and a cooling fluid, such as water, may be circulated therethrough.

An inlet pipe 51 is provided which may be connected to a gas supply system similar to that illustrated in Fig. 1.

In order to confine the gas within the inner chamber 42 to as great an extent as possible, an inner flexible sealing ring, shown generally at 52, is provided, an enlarged section of which is illustrated in Fig. 5. The sealing ring comprises an annular shoe 53 comprised of asbestos or the like which may be secured, as illustrated, to the underside of the annular ring 45. Within the shoe 53 a rubber hose 54 may be provided which may be filled with a cooling medium, such as water. A thermal insulation strip 55 is provided around the bottom of the rubber hose 54 in order to prevent injury thereto from heat resulting from the welding operation. In order to prevent the lower surface of the shoe 53 from wearing out rapidly, a series of metallic scales 56 may be provided, as illustrated.

It will be understood that the flexible sealing ring 52 does not provide an absolutely gas-tight connection between the inner chamber 42 and the work 52, but rather that it is very nearly gas tight.

It will be apparent that there will be some leakage past the under-surface of the inner flexible sealing ring 52. In order to confine this escaping gas, an outer annular chamber 61 is provided having a second flexible sealing ring 62 between it and the work, as illustrated. A pump 63, Fig. 4, is provided for maintaining the pressure within the outer chamber 61 slightly below atmospheric so that any gas escaping from the inner chamber 42 will be exhausted by the pump 63.

As illustrated, the pump 63 exhausts the gas from the outer chamber 61 into a purifying device 64 which serves to recover the inert gas or gases used for blanketing the arc 13 and returns it or them for repeated use. A valve 65 may be provided for maintaining the pressure within the inner chamber 42 at a predetermined value by supplying additional quantities of make-up gas from a reservoir or gas bottle 66, as will be readily understood.

In order to permit the operator to view the position and operation of the arc 13, a viewing tube 70 is provided which may be mounted on the chamber 42 by means of a suitable support member 71, as illustrated. The viewing tube 70 may be constructed of any suitable material, and it is preferably of conical shape in order to provide for more advantageously viewing the arc. A lens 72 is provided for focusing the image of the arc 13 on a ground glass plate 73 so that its operation may be observed without necessitating the use of the customary helmet containing colored glass for removing the injurious rays emitted by the arc.

Ports 74 are provided near the lens 72, as illustrated, to permit the gas within the inner chamber 42 to be circulated downwardly through the lower part of the viewing tube 70 so that it will not be filled with the relatively opaque gas formed by the welding operation and thereby prevent the operator from obtaining a clear vision of the arc 13.

In operation, any suitable means may be provided for moving the work 14 relative to the welding electrode 11. Because of the gas connections to the inner and outer chambers 42 and 61, respectively, it is preferable to move the work 14 while holding the electrode nozzle 12 relatively stationary. However, it will be understood that the work may be maintained in a fixed position and the nozzle 12, together with the electrode 11, moved if such method of operation is desired.

Since certain further changes may be made in the above construction and different embodiments of the invention may be made without departing from the scope thereof, it is intended that all matter contained in the above description or shown in the accompanying drawings shall be interpreted as illustrative and not in a limiting sense.

I claim as my invention:

1. The step in the process of arc welding which comprises blanketing the arc with a relatively inert gas in combination with oxygen and nitrogen in such quantity that the resulting partial pressures of oxygen and nitrogen in the welding atmosphere are substantially the same as the dissociation pressures of the oxides and nitrides of the work being welded at the fusion temperature.

2. The step in the process of arc welding which comprises providing the arc with a gaseous sheath including at least one relatively inert gas, oxygen and nitrogen in such quantities that the partial pressures of the oxygen and nitrogen in the welding atmosphere are not substantially greater than the dissociation pressures of the oxides and nitrides of the work being welded at the fusion temperature.

PORTER H. BRACE.